March 23, 1948.  C. N. RICHARDSON  2,438,252
PURIFICATION OF HYDROGEN PEROXIDE BY A NON-CONCENTRATING DISTILLATION
Filed Feb. 26, 1942

INVENTOR
Chester N. Richardson
BY
ATTORNEYS

Patented Mar. 23, 1948

2,438,252

UNITED STATES PATENT OFFICE 2,438,252

PURIFICATION OF HYDROGEN PEROXIDE BY A NONCONCENTRATING DISTILLATION

Chester Northup Richardson, Youngstown, N. Y., assignor to The Mathieson Alkali Works, Inc., New York, N. Y., a corporation of Virginia Application February 26, 1942, Serial No. 432,419

8 Claims. (Cl. 202—39)

This invention relates to improvements in the purification of aqueous hydrogen peroxide, and particularly to the separation therefrom of relatively non-volatile impurities. The invention is especially useful in the production of the pure aqueous hydrogen peroxide of commercial concentration.

Under certain methods of preparing hyrogen peroxide, the product may be contaminated with various impurities, some of which are relatively volatile and others relatively non-volatile. The more volatile impurities are readily removable by known methods, and the present invention is directed to the separation of the relatively non-volatile impurities in solution or in suspension or partly in solution or present as colloids, including inorganic impurities such as iron, nickel, copper, mercury and other metals and their compounds, silica and the like. These impurities, even in traces, may render the aqueous hydrogen peroxide unstable or they may impart undesirable color, odor or taste to the product.

It is the object of the present invention to afford a simple and effective method of separating relatively non-volatile impurities, including those mentioned and others, from aqueous hydrogen peroxide, and to produce thereby a commercial product having substantially the same concentration of hydrogen peroxide as that of the original impure solution but free from such impurities and consequently stable and otherwise satisfactory for commercial purposes.

Another object of the invention is the provision of a method of preparing aqueous hydrogen peroxide of constant and commercial concentration, free from impurities, in an economical and practical manner.

Figure 2:
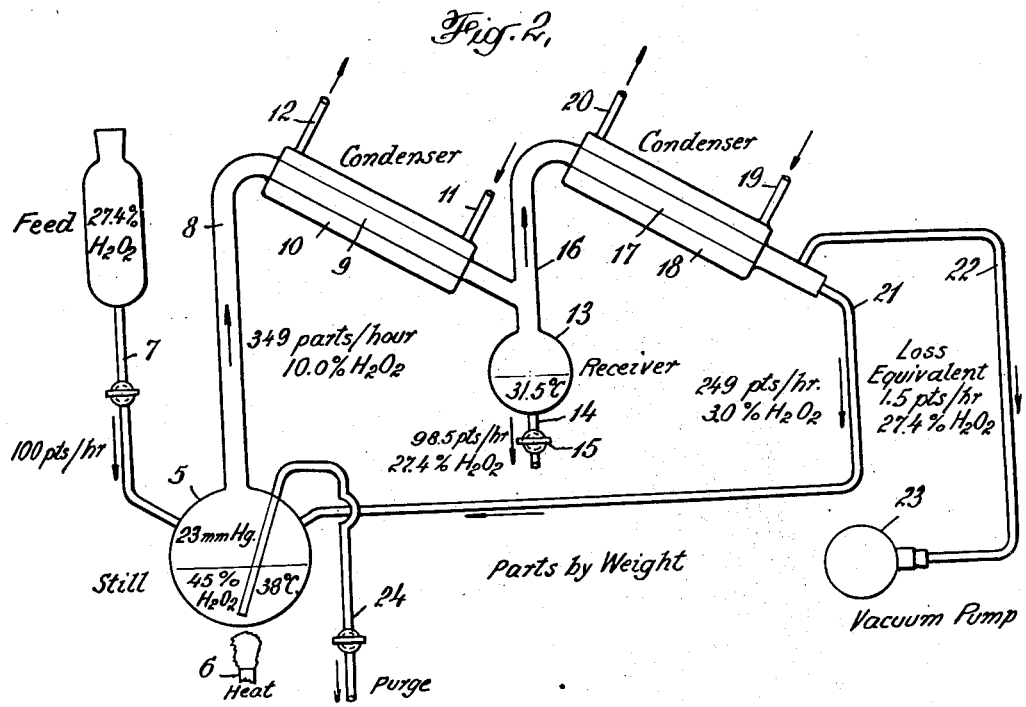
Figure 1:
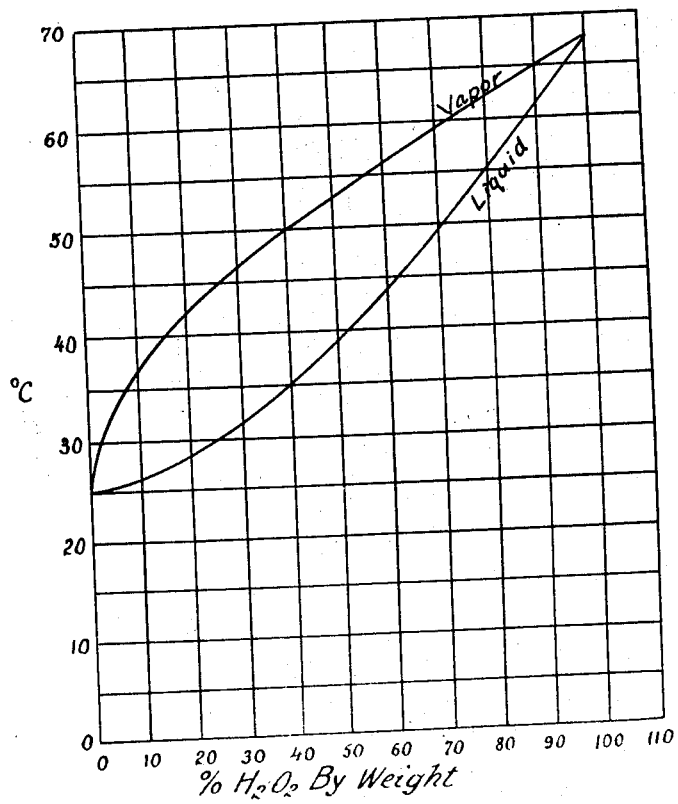

Other objects and advantages of the invention will be apparent as it is better understood by reference to the following specification and the accompanying drawing, in which Fig. 1 is a graph illustrating the equilibrium between the liquid and vapor phases of hydrogen peroxide at varying concentrations and temperatures and at absolute pressure of 23 mm. of mercury; and Fig. 2 is a diagrammatic illustration of an apparatus suitable for the practice of the invention, it being understood that details familiar to the art and unnecessary for the purpose of explaining the invention are omitted in the interest of clarity.

The aqueous hydrogen peroxide as initially recovered may include both volatile and non-volatile impurities. If volatile impurities are present, they should be removed first by any suitable procedure. A satisfactory procedure for this purpose is disclosed in U. S. Patent No. 2,298,064, granted October 6, 1942, for Chemical manufacture. In accordance with this procedure, volatile impurities including some less volatile than hydrogen peroxide, are removed by vaporizing a large volume of water containing a small proportion of hydrogen peroxide from the solution to be purified and passing these vapors in contact with the solution to vaporize the impurities, condensing the vapors, separating the vaporized and condensed impurities from the water component, and returning the water component to the solution. Volatile impurities are vaporized by the partial pressure effect of the vaporized water and, being present in but small proportion, can be eliminated thus without substantial loss of hydrogen peroxide because of the relatively low proportion in which the hydrogen peroxide is vaporized with respect to water and because the bulk of the vaporized hydrogen peroxide is returned to the solution with the vaporized and subsequently condensed water after separation of the impurities. This vaporization is best carried out under subatmospheric pressure; an absolute pressure not exceeding about 100 mm. of mercury is advantageous. The impurities, being principally immiscible with water, can be separated largely from the condensed vapors by permitting stratification to take place and then separating the stratified aqueous and oily material. This separation can be facilitated by extracting the condensed vapors with a solvent immiscible with water such as toluene or one of the other solvents used in the production of hydrogen peroxide by oxidation of organic intermediates. The water component of the condensed vapors, after separation of impurities, is with advantage returned to the aqueous hydrogen peroxide solution undergoing purification in the region within which vaporization of water and volatile impurities is effected.

Such preliminary treatment, if necessary, removes the more volatile impurities from the aqueous hydrogen peroxide and affords a solution adapted to be further purified in accordance with the present invention. The solution still includes the less volatile impurities which are not readily removable in a simple and convenient manner by methods available prior to the present invention. Indeed there were available no satisfactory data on the basis of which the present invention could have been predicated, because the equilibrium between liquid and vapor phases in hydrogen peroxide solutions had not been determined accurately and with sufficient completeness to permit the development of a method depending upon distillation and condensation of the distillate without risking the possibility of concentrations in the solution which are known to be unstable, that is above 50% to 60%. The presence of such concentrations introduced the difficulty of possibly serious explosions. It was necessary, therefore, first to carry out extensive experimental work directed to the determination of the constants for the liquid and vapor phases at varying concentrations and temperatures. For this purpose, a suitable subatmospheric pressure was selected, namely 23 mm. of mercury, as best adapted to maintenance of the operation in commercial practice by the use of a suitable vacuum pump. As the result of this investigation, the equilibrium data were determined and plotted as shown in Fig. 1 of the drawings, in which the concentrations of the vapor (condensate) and of the corresponding liquid at any given temperature can be readily determined. With such information and the knowledge that a concentration of 45% hydrogen peroxide is stable and therefore safe, it became possible to develop a simple distillation method whereby a hydrogen peroxide solution of given concentration can be recovered while the relatively non-volatile impurities are retained at the point of distillation and can be purged from time to time as they accumulate. The condensate of pure hydrogen peroxide is a commercial concentration which may be varied within the limits fixed by the phase equilibrium conditions and, by maintaining the conditions in a predetermined manner, the concentration of the product can be made uniform.

In carrying out the invention, any suitable apparatus may be utilized, as for example the arrangement diagramamtically illustrated in Fig. 2 of the drawing, in which 5 indicates a still which is supplied with heat from a source 6 and is fed with the impure hydrogen peroxide through a pipe 7 at a uniform rate. The vapor from the still passes through a leg 8 to a condenser 9 which may be supplied with cooling water or other suitable fluid in a jacket 10 through an inlet pipe 11 and outlet pipe 12. The circulation of the cooling water is regulated to maintain the desired temperature of condensation.

The condensate, consisting of the pure hydrogen peroxide solution in the desired concentration, is delivered to a receiver 13 from which it may be withdrawn through a pipe 14 controlled by a valve 15. The product thus obtained is pure hydrogen peroxide solution free from the non-volatile impurities and of the required concentration. It need not be subjected, therefore, to any further treatment other than by one of the stabilizing methods well known in the art.

The uncondensed vapor passes through a leg 16 to a second condenser 17 having also a jacket 18 which is supplied with water or other cooling liquid through a pipe 19, the cooling water being withdrawn through a pipe 20. The temperature of the condenser is maintained at the desired point to condense most of the remaining vapor which is largely water containing a relatively small amount of hydrogen peroxide. This condensate is withdrawn through a pipe 21 and returned to the still 5. Thus, any substantial loss of hydrogen peroxide is avoided.

The remaining uncondensed vapor and gases, consisting of decomposition products and a relatively small quantity of hydrogen peroxide, are withdrawn through the pipe 22 and the vacuum pump 23 and discharged. The impurities which accumulate in the still 5 may be withdrawn from time to time through a purge 24.

As hereinbefore indicated, it is possible in the operation of the simple apparatus described to regulate the conditions so as to recover pure hydrogen peroxide free from non-volatile impurities and of desired commercial concentration. Thus, for example, if 100 parts by weight per hour of 27.4% hydrogen peroxide are introduced through the pipe 7 to the still 5, it may be observed by reference to Fig. 1 that at absolute pressure of 23 mm. of mercury maintained by the vacuum pump 23, the concentration of the solution in the still can be maintained at 45% hydrogen peroxide, provided a temperature of 38° C. is maintained in the still. This will result in the vaporization of 349 parts per hour of 10% hydrogen peroxide. If then the condenser 9 is operated by adjusting the flow and temperature of the cooling water so that the vapor temperature is about 31.5° C., 98.5 parts by weight of 27.4% hydrogen peroxide will condense and will be delivered to the receiver 13. This constitutes the product of the operation and is a satisfactory concentration for commercial use.

The remainder of the vapors, amounting to 249 parts by weight per hour, containing 3% of hydrogen peroxide, passes to the condenser 17 which is maintained at a temperature of approximately 5° C. This weak solution of hydrogen peroxide returns through the pipe 21 to the still 5 where it is added to the feed and revaporized in the still.

The uncondensed residue of vapors and gas, which is equivalent to 1.5 parts by weight of 27.4% hydrogen peroxide, passes through the pipe 22 and vacuum pump 23 and is discharged. This small loss actually includes also the small amounts of non-volatile impurities which accumulate in the still and are purged from time to time. Consequently the overall efficiency of the operation is extremely high, the losses other than those due to impurities being negligible.

The apparatus employed, or that part of it in contact with aqueous hydrogen peroxide, is constructed of glass of composition inert with respect to hydrogen peroxide. Appropriate materials of construction include "Pyrex" glass. Silica, stoneware, tin, some stainless steels, some alloys of aluminum and enameled iron and steel may also be used. Materials tending catalytically to decompose hydrogen peroxide, such as ordinary steel and nickel, for example, should of course be avoided.

While reference has been made to hydrogen peroxide produced by oxidation of organic intermediates in solvents immiscible with water, the invention is of general application in the purification of hydrogen peroxide solutions where the purified solution is to be recovered at a definite concentration. The invention is applicable, therefore, to the purification of concentrated aqueous solutions of hydrogen peroxide, however produced, which may have been contaminated in any manner with any relatively non-volatile impurities.

The advantages of the invention include purification of high degree in respect to less volatile and non-volatile impurities, including both organic and inorganic impurities, low losses of hydrogen peroxide due to incidental decomposition, the avoidance of hazards of destructive decomposition, simplicity of control and economical operation.

Various changes may be made in the procedure as well as in the selected conditions of operation within the limits indicated by the graph shown in Fig. 1 of the drawings, without departing from the invention or sacrificing the advantages thereof.

I claim:

1. The method of separating an aqueous hydrogen peroxide solution from relatively non- 1. The method of separating an aqueous hydrogen peroxide solution from relatively nonvolatile impurities which comprises heating the solution under vacuum at a substantially constant temperature such that a safe concentration is maintained, condensing a portion of the vapor under vacuum at a substantially constant temperature adapted to afford a condensate having a concentration of hydrogen peroxide substantially the same as that of the original impure aqueous hydrogen peroxide solution subjecting the remaining vapor to a second condensation at a lower temperature and returning the second condensate to the solution.

2. The method of separating an aqueous hydrogen peroxide solution from relatively nonvolatile impurities which comprises heating the solution under vacuum at a substantially constant temperature such that a safe concentration is maintained, condensing a portion of the vapor under vacuum at a substantially constant temperature adapted to afford a condensate having a concentration of hydrogen peroxide substantially the same as that of the original impure aqueous hydrogen peroxide solution subjecting the remaining vapor to a second condensation at a lower temperature, returning the second condensate to the solution and withdrawing the uncondensed residue.

3. The method of separating an aqueous hydrogen peroxide solution from relatively nonvolatile impurities which comprises continuously feeding an impure aqueous hydrogen peroxide solution, heating the solution under vacuum at a substantially constant temperature such that a safe concentration is maintained, condensing a portion of the vapor under vacuum at a substantially constant temperature adapted to afford a condensate having a concentration of hydrogen peroxide substantially the same as that of the original impure feed, subjecting the remaining vapor to a second condensation at a lower temperature and returning the second condensate to the solution.

4. The method of separating an aqueous hydrogen peroxide solution from relatively nonvolatile impurities which comprises continuously feeding an impure aqueous hydrogen peroxide solution, heating the solution under vacuum at a substantially constant temperature such that a safe concentration is maintained, condensing a portion of the vapor under vacuum at a substantially constant temperature adapted to afford a condensate having a concentration of hydrogen peroxide substantially the same as that of the original impure feed, subjecting the remaining vapor to a second condensation at a lower temperature, returning the second condensate to the solution and withdrawing the uncondensed residue.

5. The method of separating an aqueous hydrogen peroxide solution from relatively nonvolatile impurities which comprises heating the solution under vacuum to a temperature equivalent to that which at a pressure of 23 mm. of mercury will maintain a concentration not higher than 45% hydrogen peroxide, condensing a portion of the vapor under vacuum at a substantially constant temperature adapted to afford a condensate having a concentration of hydrogen peroxide substantially the same as that of the original impure aqueous hydrogen peroxide solution subjecting the remaining vapor to a second condensation at a lower temperature and returning the second condensate to the solution.

6. The method of separating an aqueous hydrogen peroxide solution from relatively nonvolatile impurities which comprises heating the solution under vacuum to a temperature equivalent to that which at a pressure of 23 mm. of mercury will maintain a concentration not higher than 45% hydrogen peroxide, condensing a portion of the vapor under vacuum at a substantially constant temperature adapted to afford a condensate having a concentration of hydrogen peroxide substantially the same as that of the original impure aqueous hydrogen peroxide solution subjecting the remaining vapor to a second condensation at a lower temperature, returning the second condensate to the solution, and withdrawing the uncondensed residue.

7. The method of separating an aqueous hydrogen peroxide solution from relatively nonvolatile impurities which comprises continuously feeding an impure aqueous hydrogen peroxide solution, heating the solution under vacuum to a temperature equivalent to that which at a pressure of 23 mm. of mercury will maintain a concentration not higher than 45% hydrogen peroxide, condensing a portion of the vapor under vacuum at a substantially constant temperature adapted to afford a condensate having a concentration of hydrogen peroxide substantially the same as that of the original impure feed, subjecting the remaining vapor to a second condensation at a lower temperature and returning the second condensate to the solution.

8. The method of separating an aqueous hydrogen peroxide solution from relatively nonvolatile impurities which comprises continuously feeding an impure aqueous hydrogen peroxide solution, heating the solution under vacuum to a temperature equivalent to that which at a pressure of 23 mm. of mercury will maintain a concentration not higher than 45% hydrogen peroxide, condensing a portion of the vapor under vacuum at a substantially constant temperature adapted to afford a condensate having a concentration of hydrogen peroxide substantially the same as that of the original impure feed, subjecting the remaining vapor to a second condensation at a lower temperature, returning the second condensate to the solution, and withdrawing the uncondensed residue.

CHESTER NORTHUP RICHARDSON.

REFERENCES CITED

The following references are of record in the file of this patent:

UNITED STATES PATENTS

| Number | Name | Date |
| --- | --- | --- |
| 898,980 | Lowenstein | Sept. 15, 1908 |
| 1,145,162 | Moest | July 6, 1915 |
| 1,536,213 | Halvorsen | May 5, 1925 |
| 1,924,954 | Muller | Aug. 29, 1933 |
| 1,937,682 | Boedecker et al. | Dec. 5, 1933 |
| 2,081,097 | Reinders | May 18, 1937 |
| 2,091,218 | Schmidt | Aug. 24, 1937 |
| 2,210,438 | Adolph | Aug. 6, 1940 |
| 2,282,184 | Harrower | May 5, 1942 |

FOREIGN PATENTS

| Number | Country | Date |
| --- | --- | --- |
| 330,255 | Great Britain | May 20, 1930 |
| 445,334 | Great Britain | Apr. 7, 1936 |